UNITED STATES PATENT OFFICE.

JAMES O. JOHNSTONE, OF BUFFALO, NEW YORK.

PROCESS OF TREATING ZINC-BEARING ORE.

1,029,932.  Specification of Letters Patent.  Patented June 18, 1912.

No Drawing.  Application filed July 20, 1911. Serial No. 639,474.

*To all whom it may concern:*

Be it known that I, JAMES O. JOHNSTONE, a subject of Great Britain, residing in Buffalo, in the county of Erie and State of New York, have invented new and useful Improvements in Processes of Treating Zinc-Bearing Ore, of which the following is a specification.

This invention relates to a process for the treatment of ores containing a mixture of barites and zinc mineral, and has for its object to separate the barites from the zinc, and to recover the zinc as zinc sulfid in a simple and economical manner.

The process consists, briefly, in reducing the barites (barium sulfate) to barium sulfid, and then by leaching dissolving the barium compounds and leaving the zinc content to be recovered as zinc sulfid.

The reduction of the barites may be effected by heating the mixed ore to a red heat, or hotter, in the presence of carbon or carbonaceous matter, such as charcoal, coal, lignite, saw-dust, etc., or in the presence of producer gas, natural gas, or any fuel gas or oil, or sulfur vapor, sulfureted hydrogen, carbon disulfid vapor; or by a mixture of any or all of these reducing agents. The reduction occurs according to the following equation:

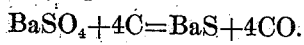

$$BaSO_4 + 4C = BaS + 4CO.$$

The reduced product is then leached with water, preferably hot, whereby the barium sulfid goes into solution, at the same time suffering partial hydrolysis. The zinc sulfid remains insoluble. Any barium carbonate present in the original ore or produced during the treatment will also be associated with the zinc sulfid. This barium carbonate may be removed by dissolving it in any suitable dilute acid, such as hydrochloric or acetic acid, that will not appreciably attack the zinc blende. The reaction proceeds according to the following equation:

$$BaCO_3 + 2HCl = BaCl_2 + H_2O + CO_2;$$

or—

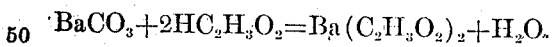

$$BaCO_3 + 2HC_2H_3O_2 = Ba(C_2H_3O_2)_2 + H_2O.$$

Another way of removing the barium carbonate would be by heating the material in a current of steam whereby the barium carbonate is changed to hydroxid, and then leaching out the barium hydroxid with hot water.

The process may be carried out on a small scale in the following manner: The ore containing the zinc and barites is first crushed to 16 or 20 mesh and concentrated to remove lime, silica, etc. One hundred pounds of cleaned ore (wet or dry) is next mixed intimately with twenty pounds of powdered charcoal. The mixture is then charged into the zinc retort which is sealed, except for a small opening to let the carbonic oxid escape. It is then heated for three hours. The mixture is next taken from the retort as rapidly as possible and put in an iron receptacle which should then be covered so as to prevent combustion. It is difficult to prevent combustion to some extent when operating on this small scale during the transfer from the retort to the receptacle. When fairly cool the mixture is crushed to about 6 or 10 mesh, but must not be pulverized. The crushed material is then charged into a leaching vat, and boiling water is run into the vat slowly, so as to use not more than about one-half of a gallon of water per minute. If the water should flow faster than this the exit from the vat may be plugged to reduce the rate of flow. The level of water in the vat should be kept above the level of the solid. The pouring in of the hot water should continue until about fifty gallons has been used, or until the filtrate shows only a little precipitate with a solution of sodium carbonate. This operation should take from two to four hours. The first twenty or twenty-five gallons of filtrate should be received in a separate wooden receptacle, such as a barrel, from the remainder, and should show crystals of barium sulfid when cool. In practice the second half of the wash water would be used to leach a fresh portion of roasted ore; in this way it also would become saturated and yield crystals on cooling, and so there would be economy in the use of hot water. If the mass in the vat should cake when the water is first added, due to cooling and crystallization, it may be necessary to break it up with a rod. If, however, the water flows at all it need not be disturbed for subsequent portions of hot water will loosen it. When the leaching has been completed the residue may be again placed in the retort for a second treatment. More charcoal may have to be added if the first portion seems to have been all used up. It is heated in the retort for from two and one-half to three hours, then transferred to the iron receptacle, cooled, crushed to 10 mesh, and placed in the leaching vat as before. It is then leached with about twenty gallons of hot water and allowed to drain thoroughly. The next step consists in pouring over the mass about ten gallons of fourteen per cent. acetic acid solution. This is obtained by mixing five gallons of commercial twenty-eight per cent. acid with an equal solution of boiling water. The filtrate is received in a wooden tub or barrel, and is passed through a second time. If it passed through very slowly the first time, the second treatment may be omitted. The ore is finally washed by pouring over it about two gallons of water. To regenerate the acetic acid it is necessary to know by analysis the amount of barium it has taken into solution. Then by adding the exact amount of sulfuric acid to precipitate the barium as insoluble barium sulfate, the acetic acid is regenerated and ready for the next treatment. The barium sulfate after filtering and washing is ready for the market as blanc fixe.

If the leached product is sufficiently high grade without the acid treatment the latter may be omitted.

I claim:

1. The process of treating ores containing zinc and barites which consists in heating the ore in the presence of a reducing agent which converts the barium sulfate to barium sulfid, and subsequently leaching the mixture whereby the barium sulfid will go into solution and leave insoluble zinc sulfid.

2. The process of treating ores containing zinc and barites which consists in heating the ore in the presence of a carbonaceous reducing agent which converts the barium sulfate to barium sulfid, and subsequently leaching the mixture whereby the barium sulfid will go into solution and leave insoluble zinc sulfid.

3. The process of treating ores containing a mixture of zinc and barites which consists in reducing the barium sulfate to barium sulfid by heating the mixture in the presence of a reducing agent and subsequently leaching the mixture, whereby the barium compounds are dissolved and the zinc compounds are left as insoluble sulfids.

4. The process of treating ores containing a mixture of zinc and barites which consists in heating the mixed ore to a red heat, or hotter, in the presence of a reducing agent which converts the barium sulfate to barium sulfid, and subsequently leaching the mixture with water whereby the barium sulfid goes into solution and the zinc content may be recovered in the form of insoluble zinc sulfid.

5. The process of treating ore containing a mixture of zinc and barites which consists in heating the mixture in the presence of a reducing agent which converts the barium sulfate to barium sulfid, then leaching the mixture, whereby the barium sulfid goes into solution, and then removing any barium carbonate present in the original ore or produced during the treatment by dissolving it in a dilute acid.

6. The process of treating ore containing a mixture of zinc and barites which consists in heating the mixture in the presence of a carbonaceous reducing agent which converts the barium sulfate to barium sulfid, then leaching the mixture, whereby the barium sulfid goes into solution, and then removing any barium carbonate present in the original ore or produced during the treatment by dissolving it in a dilute acid.

7. The process of treating ore containing a mixture of zinc and barites which consists in heating the ore in the presence of a reducing agent which converts the barium sulfate to barium sulfid, subsequently leaching the mixture, whereby the barium sulfid goes into solution, then pouring dilute acid over the ore to recover any barium carbonate, and then adding sulfuric acid to the solution to precipitate insoluble barium sulfate.

8. The process of treating ore containing a mixture of zinc and barites which consists in heating the ore in the presence of a reducing agent which converts the barium sulfate to barium sulfid, subsequently leaching the product, whereby the barium sulfid goes into solution and leaves insoluble zinc sulfids, then again heating the residue, and again leaching the same.

9. The process of treating ore containing a mixture of zinc and barites which consists in heating the ore in the presence of a reducing agent which converts the barium sulfate to barium sulfid, subsequently leaching the product, whereby the barium sulfid goes into solution and leaves insoluble zinc sulfids, then again heating the residue, and again leaching the same, and finally subjecting said zinc residue to the action of a weak acid to remove any barium carbonate.

In testimony whereof, I have hereunto set my hand in presence of two subscribing witnesses.

JAMES O. JOHNSTONE.

Witnesses:
JOHN L. GARRETSON,
GEO. D. CLUCAS.